US012481987B2

(12) United States Patent
Jevans

(10) Patent No.: US 12,481,987 B2
(45) Date of Patent: *Nov. 25, 2025

(54) VERIFICATION SYSTEMS FOR BLOCKCHAINS AND DISTRIBUTED LEDGERS

(71) Applicant: CipherTrace, Inc., Menlo Park, CA (US)

(72) Inventor: David Jevans, Menlo Park, CA (US)

(73) Assignee: CipherTrace, Inc, Menlo Park, CA (US)

(*) Notice: Subject to any disclaimer, the term of this patent is extended or adjusted under 35 U.S.C. 154(b) by 863 days.

This patent is subject to a terminal disclaimer.

(21) Appl. No.: 17/541,116

(22) Filed: Dec. 2, 2021

(65) Prior Publication Data
US 2022/0092587 A1  Mar. 24, 2022

Related U.S. Application Data

(63) Continuation-in-part of application No. 16/252,209, filed on Jan. 18, 2019, now Pat. No. 11,251,937.
(Continued)

(51) Int. Cl.
  *G06F 21/00* (2013.01)
  *G06Q 20/38* (2012.01)
  *G06Q 20/40* (2012.01)

(52) U.S. Cl.
  CPC ... *G06Q 20/3825* (2013.01); *G06Q 20/38215* (2013.01); *G06Q 20/4014* (2013.01); *G06Q 20/405* (2013.01); *G06Q 20/407* (2013.01)

(58) Field of Classification Search
  None
  See application file for complete search history.

(56) References Cited

U.S. PATENT DOCUMENTS 9,298,806 B1 * 3/2016 Vessenes ............... G06F 16/244
9,635,000 B1 * 4/2017 Muftic .................. H04L 9/3239
(Continued)

FOREIGN PATENT DOCUMENTS

CN  104320262 A  1/2015
EP  3884411 A1  9/2021
(Continued)

OTHER PUBLICATIONS

Patent Cooperation Treaty Application No. PCT/US2019/014346, International Search Report and Written Opinion of the International Searching Authority, Apr. 22, 2019, 6 pages.
(Continued)

*Primary Examiner* — Bassam A Noaman
*Assistant Examiner* — Hassan A Hussein
(74) *Attorney, Agent, or Firm* — Barta Jones, PLLC

(57) ABSTRACT

Provided herein are exemplary systems and methods for creating a secure self-validating network of blockchain/distributed ledger participants. Some exemplary mechanisms support self-validation, mutual-validation, external-validation and privacy controls. Such mechanisms enable the deployment and continued operation of large scale blockchain and distributed ledger systems with a self-certifying security system. They create the ability for rules to be codified to control the rights, privileges and access of nodes depending on their self-certification and external-certification. Also provided is an audit trail of these certifications which can be used for liability claims, insurance, security analytics and forensics.

20 Claims, 3 Drawing Sheets

Related U.S. Application Data

(60) Provisional application No. 62/619,839, filed on Jan. 21, 2018.

(56) References Cited

U.S. PATENT DOCUMENTS

| | | | |
|---|---|---|---|
| 10,102,265 B1* | 10/2018 | Madisetti | G06F 16/27 |
| 10,171,476 B2* | 1/2019 | Khan | H04L 9/3234 |
| 10,891,694 B1 | 1/2021 | Leise et al. | |
| 11,206,137 B2 | 12/2021 | Yu et al. | |
| 12,293,359 B1* | 5/2025 | Caswell | G06Q 20/389 |
| 2006/0184528 A1* | 8/2006 | Rodeh | G06F 16/27 |
| 2006/0248016 A1* | 11/2006 | Ginter | H04N 21/25875 |
| | | | 375/E7.009 |
| 2011/0251951 A1 | 10/2011 | Kolkowitz et al. | |
| 2013/0018796 A1 | 1/2013 | Kolhatkar et al. | |
| 2014/0047544 A1 | 2/2014 | Jakobsson | |
| 2015/0032625 A1 | 1/2015 | Dill et al. | |
| 2015/0318995 A1* | 11/2015 | Leggette | H04L 63/0435 |
| | | | 713/181 |
| 2015/0332283 A1* | 11/2015 | Witchey | G16H 10/60 |
| | | | 705/3 |
| 2015/0381637 A1* | 12/2015 | Raff | H04L 63/0218 |
| | | | 726/23 |
| 2016/0012465 A1* | 1/2016 | Sharp | G06Q 20/321 |
| | | | 705/14.17 |
| 2016/0071108 A1 | 3/2016 | Caldera et al. | |
| 2016/0217436 A1 | 7/2016 | Brama | |
| 2016/0261690 A1* | 9/2016 | Ford | G06F 21/645 |
| 2016/0283920 A1* | 9/2016 | Fisher | H04L 9/3239 |
| 2016/0283941 A1* | 9/2016 | Andrade | G06Q 20/3829 |
| 2016/0300227 A1 | 10/2016 | Subhedar et al. | |
| 2016/0300234 A1* | 10/2016 | Moss-Pultz | H04L 9/3247 |
| 2016/0330027 A1* | 11/2016 | Ebrahimi | H04L 9/3066 |
| 2016/0342994 A1* | 11/2016 | Davis | G06Q 40/02 |
| 2017/0005804 A1* | 1/2017 | Zinder | H04L 9/3239 |
| 2017/0011460 A1* | 1/2017 | Molinari | H04L 9/3247 |
| 2017/0031676 A1* | 2/2017 | Cecchetti | H04L 9/50 |
| 2017/0034197 A1 | 2/2017 | Daniel et al. | |
| 2017/0093830 A1* | 3/2017 | Wuehler | H04L 63/0442 |
| 2017/0111175 A1* | 4/2017 | Oberhauser | G06F 21/33 |
| 2017/0132620 A1* | 5/2017 | Miller | H04L 9/0637 |
| 2017/0132635 A1 | 5/2017 | Caldera | |
| 2017/0132636 A1 | 5/2017 | Caldera | |
| 2017/0206604 A1* | 7/2017 | Al-Masoud | G06Q 40/08 |
| 2017/0214701 A1 | 7/2017 | Hasan | |
| 2017/0236094 A1* | 8/2017 | Shah | H04L 9/3236 |
| | | | 705/300 |
| 2017/0250972 A1* | 8/2017 | Ronda | H04L 9/0891 |
| 2017/0270534 A1 | 9/2017 | Zoldi et al. | |
| 2017/0293669 A1* | 10/2017 | Madhavan | G06F 16/2365 |
| 2017/0316390 A1 | 11/2017 | Smith et al. | |
| 2017/0330180 A1* | 11/2017 | Song | G06Q 20/401 |
| 2017/0344988 A1* | 11/2017 | Cusden | G06F 21/00 |
| 2017/0352116 A1* | 12/2017 | Pierce | H04L 67/53 |
| 2017/0366348 A1* | 12/2017 | Weimer | H04L 9/3239 |
| 2018/0006826 A1* | 1/2018 | Smith | H04L 63/0823 |
| 2018/0018723 A1 | 1/2018 | Nagla et al. | |
| 2018/0039667 A1* | 2/2018 | Pierce | H04L 9/3247 |
| 2018/0082256 A1* | 3/2018 | Tummuru | H04L 9/3247 |
| 2018/0089256 A1* | 3/2018 | Wright, Sr. | G06Q 20/1235 |
| 2018/0108024 A1* | 4/2018 | Greco | G06K 7/10366 |
| 2018/0109541 A1* | 4/2018 | Gleichauf | H04W 12/06 |
| 2018/0137306 A1* | 5/2018 | Brady | G06F 9/45558 |
| 2018/0183606 A1* | 6/2018 | High | H04L 9/3239 |
| 2018/0211038 A1 | 7/2018 | Breiman et al. | |
| 2018/0219671 A1* | 8/2018 | Velissarios | H04L 9/30 |
| 2018/0240107 A1 | 8/2018 | Andrade | |
| 2018/0253702 A1* | 9/2018 | Dowding | H04L 63/123 |
| 2018/0276666 A1* | 9/2018 | Haldenby | H04L 9/3268 |
| 2018/0285879 A1* | 10/2018 | Gadnis | H04L 9/3231 |
| 2018/0330385 A1* | 11/2018 | Johnson | G06Q 10/107 |
| 2018/0331835 A1* | 11/2018 | Jackson | H04L 9/3297 |
| 2019/0018888 A1* | 1/2019 | Madisetti | G06F 16/27 |
| 2019/0057362 A1* | 2/2019 | Wright | G06Q 20/065 |
| 2019/0081961 A1* | 3/2019 | Bansal | H04L 67/10 |
| 2019/0132350 A1* | 5/2019 | Smith | G06F 21/60 |
| 2019/0156301 A1 | 5/2019 | Bentov et al. | |
| 2019/0164156 A1* | 5/2019 | Lindemann | H04L 63/0861 |
| 2019/0196899 A1 | 6/2019 | Sylvester, II et al. | |
| 2019/0199535 A1* | 6/2019 | Falk | G06F 16/1824 |
| 2019/0229892 A1 | 7/2019 | Jevans | |
| 2019/0245699 A1* | 8/2019 | Irwan | H04L 9/0618 |
| 2019/0279215 A1 | 9/2019 | Kuchar | |
| 2019/0354725 A1 | 11/2019 | Lowagie | |
| 2019/0370797 A1* | 12/2019 | Jevans | G06Q 20/4016 |
| 2020/0160344 A1 | 5/2020 | Jevans et al. | |
| 2020/0162485 A1 | 5/2020 | Jevans et al. | |
| 2020/0167779 A1 | 5/2020 | Carver et al. | |
| 2020/0351278 A9 | 11/2020 | Jevans et al. | |
| 2021/0006399 A1 | 1/2021 | Lee | |
| 2021/0075592 A1* | 3/2021 | Zhuo | G06F 11/1076 |

FOREIGN PATENT DOCUMENTS

| | | |
|---|---|---|
| EP | 3884441 A1 | 9/2021 |
| GB | 2593647 A1 | 9/2021 |
| GB | 2594396 A1 | 10/2021 |
| WO | WO2019071458 A1 | 4/2019 |
| WO | WO2019144042 A1 | 7/2019 |
| WO | WO2019231772 A1 | 12/2019 |
| WO | WO2020010279 A1 | 1/2020 |
| WO | WO2020106638 A1 | 5/2020 |
| WO | WO2020106639 A1 | 5/2020 |

OTHER PUBLICATIONS

Patent Cooperation Treaty Application No. PCT/US2019/033399, International Search Report and Written Opinion of the International Searching Authority, Aug. 1, 2019, 8 pages.

Patent Cooperation Treaty Application No. PCT/US2019/062047, International Search Report and Written Opinion of the International Searching Authority, Jan. 24, 2020, 13 pages.

Patent Cooperation Treaty Application No. PCT/US2019/062049, International Search Report and Written Opinion of the International Searching Authority, Jan. 27, 2020, 10 pages.

Biryukov et al., "Deanonymisation of clients in Bitcoin P2P network", Jul. 5, 2014, Retrieved from the internet: <https://arxiv.org/abs/1405. 74 183> on May 25, 2021, 15 pages.

Chaum, D., "Blind signatures for untraceable payments" in Chaum D., Rivest R.L., Sherman A.T. (eds) Advances in Cryptology: Proceedings of Crypto 82, 1983, pp. 199-203.

Chaum, David Lee, "Computer Systems Established, Maintained, and Trusted by Mutually Suspicious Groups", Dissertation, Department of Computer Science, University of California, Berkeley, May 22, 1982, 96 pages.

Fleder et al., "Bitcoin Transaction Graph Analysis", Feb. 5, 2015 [retrieved May 25, 2021]; Retrieved from the Internet: <https://arxiv.org/abs/1502.01657>, 8 pages.

Kharraz et al., "Cutting the Gordian Knot: A Look under the Hood of Ransomware Attacks", International Conference on Detection of Intrusions and Malware, and Vulnerability Assessment, Jun. 23, 2015, Retrieved from the Internet <http://193.55.114.1/docs/dimva15_ransomware.pdf> on Jan. 2020, 28 pages.

Kun (j2kun), "Optimism in the Face of Uncertainty: the UCB1 Algorithm", [online] Oct. 28, 2013 [retrieved Jun. 9, 2021]; Retrieved from the internet: <https://jeremykun.com/2013/10/28/optimism-in-the-face-of-uncertainty-the-ucb1-algorithm/>, 17 pages.

Meiklejohn et al., "A Fistful of Bitcoins: Characterizing Payments Among Men with No Names", IMC '13: Proceedings of the 2013 conference on Internet measurement conference, Oct. 2013, 127-140, Retrieved from the internet: <https://cseweb.ucsd.edu>, <https://cseweb.ucsd.edu/~smeiklejohn/files/imc13.pdf> on May 25, 2021, 13 pages.

Moser et al., "An Inquiry into Money Laundering Tools in the Bitcoin Ecosystem", IEEE 2013 APWG eCrime Researchers Summit (eCRS), 2013, 1-14, Retrieved from the internet: <https://maltemoeser.de>, <https://maltemoeser.de/paper/money-laundering.pdf> on retrieved May 25, 2021, 14 pages.

(56) References Cited

OTHER PUBLICATIONS

Prasad, "Lessons From Implementing AlphaZero", Web page <https://medium.com/oracledevs/lessons-from-implementing-alphazero-7e36e9054191>, Jun. 5, 2018, Retrieved from the internet on Jun. 9, 2021, 4 pages.

Reid et al., "An Analysis of Anonymity in the Bitcoin System," in Privacy, security, risk and trust (PASSAT), 2011 IEEE Third international Conference on Social Computing (Socialcom). IEEE, 2011, pp. 1318-1326.

Reid et al., "An Analysis of Anonymity in the Bitcoin System", Jul. 22, 2011 [retrieved May 25, 2021]; Retrieved from the internet: <https://arxiv.org/abs/1107.4524>, 30 pages.

Van Saberhagen, "CryptoNote v 2.0", Bytecoin, Oct. 17, 2013, Retrieved from the internet <https://bytecoin.org/>, <https://bytecoin.org/old/whitepaper.pdf> on May 25, 2021, pp. 1-20.

Welsh, "Bandit Algorithms Continued UCB1", University of Birmingham, School of Computer Science—Lecture Notes, <https://www.cs.bham.ac.uk/internal/courses/robotics/lectures/>, Nov. 9, 2010, 17 pages.

Ye et al., "Alt-Coin Traceability", The International Association for Cryptologic Research Archive, May 18, 2020, Retrieved from the internet: <https://eprint.iacr.org/2020/593> on May 25, 2021, 24 pages.

* cited by examiner

VERIFICATION SYSTEMS FOR BLOCKCHAINS AND DISTRIBUTED LEDGERS

CROSS-REFERENCE TO RELATED APPLICATIONS

The present application is a continuation-in-part of U.S. Nonprovisional patent application Ser. No. 16/252,209 filed on Jan. 18, 2019, which claims the priority benefit of U.S. Provisional Patent Application Ser. No. 62/619,839 filed on Jan. 21, 2018. The entirety of the aforementioned disclosures are hereby incorporated by reference herein including any references disclosed therein.

FIELD OF THE TECHNOLOGY

The present technology relates generally to the security of distributed networks.

SUMMARY OF THE PRESENT TECHNOLOGY

Provided herein are exemplary systems and methods for the following functionalities according to various embodiments.

Blockchain nodes and participants to publish self and third-party security evaluations/validations/certifications/claims to one or more blockchains or distributed ledgers (security certifications) in some embodiments.

A mechanism to perform security validation of private and public blockchains and distributed ledger using security validations/evaluations/certifications/claims that are published to the blockchain(s)/distributed ledgers in various embodiments.

A mechanism to verify said security chains in some embodiments.

A mechanism to encrypt security claims so that only authorized participants can read the security claims in various embodiments.

A mechanism to encrypt subsets of security claims so that only authorized participants can read those subsets of security claims is some embodiments.

A mechanism to publish said security verifications to the blockchain/distributed ledgers in various embodiments.

A mechanism to cross-certify participants in the blockchain in some embodiments.

A mechanism to grant privileged access to other participants in the blockchain to validate the security and integrity of a node/participant in the blockchain and to publish that to the blockchain in various embodiments.

A mechanism for participants in a blockchain to issue security challenges to other participants on the blockchain, and for those challenged to respond with claims and responses on the blockchain in some embodiments.

A mechanism to securely publish security scan and validation claims onto the blockchain without disclosing this data to potential attackers by using encryption of authorized receivers or by encrypting decryption keys with the keys of authorized decrypters which may include auditors and arbitrators in various embodiments.

A mechanism to revoke private keys and public keys in the blockchain(s) in some embodiments.

A mechanism to help ensure that public and private blockchains/distributed ledgers/tangles will be trustworthy and in the case of a security breach, the affected party can be decoupled from the blockchain until their security is repaired and validated in various embodiments.

A mechanism to agree for rollbacks of blockchains in some embodiments.

A mechanism to agree to the rollback of a subset of transactions and to re-certify the blockchain to a new set, in various embodiments.

A mechanism to use time-based analysis of security certifications to determine the trustworthiness of blockchain participants in some embodiments.

In various embodiments of the present technology, the security certifications are described in XML format.

In some embodiments of the present technology the security certifications are described in JSON format.

In some aspects, the techniques described herein relate to a method for creating a secure self-validating network of distributed ledger participants, the method including: providing a security verification service communicatively coupled to a central blockchain, the security verification service including time-based analysis of security certifications of plurality of entities to determine a trustworthiness of each of a plurality of entities communicatively coupled to the central blockchain, the security verification service determining a trustworthiness independent of actual participants in the blockchain; providing a consensus message to the plurality of entities to roll back the blockchain to a last time a compromised party published a secure transaction to the blockchain; and verifying a security evaluation, validation or certification of other entities on the network including: each entity signing a message with a private key; each entity verifying an operating system version; each entity verifying a software version; each entity confirming a copy of the blockchain; and each entity using a hash of the blockchain for each respective entity combined with a hash of an environment for each respective entity and sending the hash to the blockchain with a timestamp and nonce.

In some aspects, the techniques described herein relate to a method, further including encrypting the security evaluation, validation or certification so that only authorized entities can read encrypted information.

In some aspects, the techniques described herein relate to a method, further including an entity cross-certifying another entity in the network.

In some aspects, the techniques described herein relate to a method, further including an entity in the network issuing a security challenge to another entity in the network.

In some aspects, the techniques described herein relate to a method, further including an entity in the network revoking a public key in a blockchain on the network.

In some aspects, the techniques described herein relate to a method, further including an entity in the network revoking a private key in the blockchain on the network.

In some aspects, the techniques described herein relate to a method, further including one or more the plurality of the entities in the network predefining a condition for a rollback of a blockchain.

In some aspects, the techniques described herein relate to a method, further including one or more of the plurality of the entities in the network predefining a condition for a rollback of a subset of transactions in the blockchain.

In some aspects, the techniques described herein relate to a method, wherein the security verification service includes a percentage score of each of the plurality of entities in the network based on a certification from other entities in the network.

In some aspects, the techniques described herein relate to a method, wherein the security verification service includes detecting operating system changes for the plurality of entities in the network and detecting unpatched operating system versions for the plurality of entities in the network.

In some aspects, the techniques described herein relate to a method for creating a secure self-validating network of distributed ledger participants, the method including: providing a security verification service communicatively coupled to a central blockchain, the security verification service including time-based analysis of security certifications of plurality of entities to determine a trustworthiness of each of a plurality of entities communicatively coupled to the central blockchain, the security verification service determining a trustworthiness independent of actual participants in the blockchain; providing a consensus message to the plurality of entities to roll back the blockchain to a last time a compromised party published a secure transaction to the blockchain; and verifying a security evaluation, validation or certification of other entities on the network.

In some aspects, the techniques described herein relate to a method, wherein the security verification service includes detecting operating system changes for the plurality of entities in the network and detecting unpatched operating system versions for the plurality of entities in the network.

In some aspects, the techniques described herein relate to a method, wherein the security verification service includes detecting operating system changes for the plurality of entities in the network and detecting unpatched operating system versions for the plurality of entities in the network.

In some aspects, the techniques described herein relate to a method, further including encrypting the security evaluation, validation or certification so that only authorized entities can read encrypted information, the encrypted information being encrypted and decrypted using encryption keys managed in hardware, the hardware being a Hardware Security Module (HSM).

In some aspects, the techniques described herein relate to a method, wherein the security verification service is a revocation authority, the security verification authority removing an entity of the plurality of entities.

In some aspects, the techniques described herein relate to a method, wherein the security verification service is an attestation service, the attestation service periodically checking integrity of an entity of the plurality of entities.

In some aspects, the techniques described herein relate to a method, wherein the security verification service works with third party services to maintain proper controls, third party services providing Know Your Customer verification.

In some aspects, the techniques described herein relate to a method, further including encrypting the security evaluation, validation or certification so that only authorized entities can read encrypted information, wherein the encrypted information is encrypted and decrypted using encryption keys, the encryption keys including symmetric keys and a public key of authorized receivers.

In some aspects, the techniques described herein relate to a method, further including encrypting the security evaluation, validation or certification so that only authorized entities can read encrypted information, wherein the encrypted information is encrypted and decrypted using encryption keys, the encryption keys including a public key of authorized receivers allowing for publication in plain text of a security scan result.

In some aspects, the techniques described herein relate to a method for creating a secure self-validating network of distributed ledger participants, the method including: providing a security verification service communicatively coupled to a central blockchain, the security verification service including time-based analysis of security certifications of plurality of entities to determine a trustworthiness of each of a plurality of entities communicatively coupled to the central blockchain, the security verification service determining a trustworthiness independent of actual participants in the blockchain; providing a consensus message to the plurality of entities to roll back the blockchain to a last time a compromised party published a secure transaction to the blockchain; verifying a security evaluation, validation or certification of other entities on the network; and wherein the security verification service includes detecting operating system changes for the plurality of entities in the network and detecting unpatched operating system versions for the plurality of entities in the network.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1A:
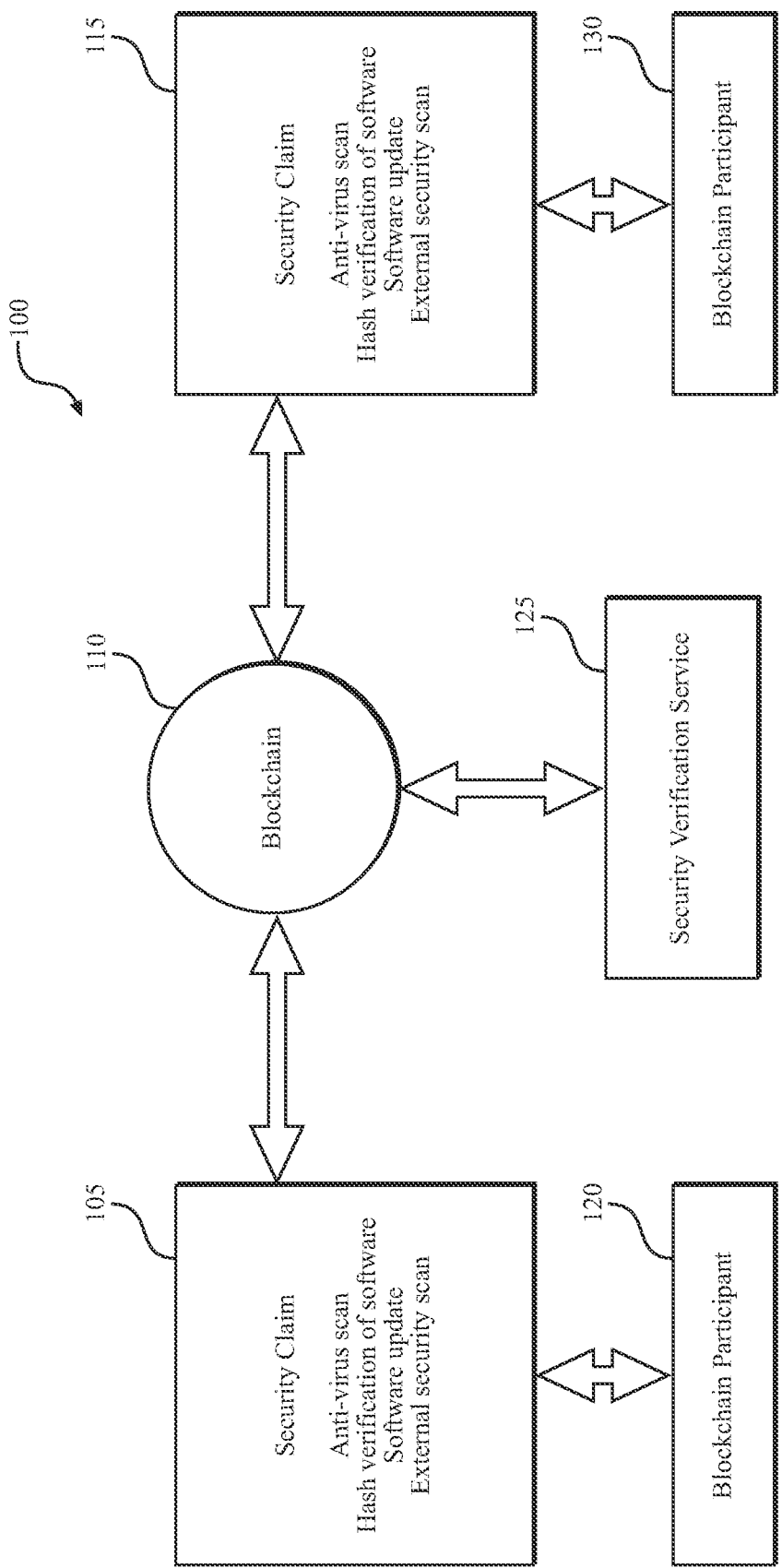
FIG. 1A shows blockchain participating nodes issuing and receiving security certifications to and from the shared blockchain.

Virtual currencies, or crypto currencies, are becoming widespread across the globe. Crypto currencies were invented in 1983 with the seminal whitepaper from David Chaum describing how cryptography could be used to transfer measures of value between persons over computer networks.

In 2009, the Bitcoin protocol and ideology was introduced. This electronic currency took hold and has expanded into a global phenomenon.

Bitcoin is based on the concept of a blockchain, which is a cryptographically verified distributed ledger of transactions and messages. Blockchains are being used to re-engineer business processes such as payments, financial reconciliations, stock clearing, remittance, deeds, titles, trade finance, supply chain security, gaming, identity and a myriad of other processes and industries. These systems use a distributed consensus mechanism for creating a shared ledger that can be trusted for sensitive and valuable business transactions and document exchanges.

Deployment of blockchain-based systems require an infrastructure for distributed security.

The various exemplary embodiments disclosed herein include a mechanism for distributed security in consensus based distributed ledgers such as blockchains, distributed ledgers, tangles and similar distributed systems.

Hackers have continually attacked blockchain/distributed ledger systems and will continue to do so.

There will be flaws in the implementation of blockchain/distributed ledger systems which need upgrading lest they influence the veracity and security of the blockchains that they participate in.

Privacy of the security statements must be preserved and only available to authorized participants, auditors, investigators or other parties.

This will help ensure that public and private blockchains/distributed ledgers/tangles will be trustworthy and in the case of a security breach, the affected party can be decoupled from the blockchain until their security is repaired and validated. This can also serve as the base for agreed-upon rollbacks of blockchains. For example, if a smart contract or a node in the network is compromised, all nodes can roll-back to the latest agreed secure state of the blockchain. Furthermore, chains of the blockchain can be preserved if a subset of the participants is deemed insecure or compromised.

This can create the basis for a distributed consensus on not only the security of a blockchain or distributed ledger, but also the validity of the transactions and smart contracts executed on said blockchain. It can furthermore provide a contractual agreement foundation for parties to agree a-priori on when blockchain forks, rollbacks, updates, etc. happen. This forms the basis for the next generation of smart contract whereby participants know the rules for how security exceptions will be detected and what will happen in various cases. These may include:

Exclusion of a node from future transactions until re-secured and re-validated.

Rollback of all transactions to a certain "secured" date.

Rollback of transactions from one or more parties over a date range and re-constitution of the blockchain reflecting these changes.

Ability for arbiter nodes to make decisions about transactions and the participation of other nodes.

Ability to rollback portions of a blockchain and then re-integrate these into a new block in order to incorporate "agreed" changes into the blockchain.

FIG. 1A shows blockchain participating nodes issuing and receiving security certifications to and from the shared blockchain.

Exemplary network 100 as shown in FIG. 1A includes entities 105 and 115, blockchain 110, blockchain participant 120 (associated with entity 105), security verification service 125, and blockchain participant 130 (associated with entity 115).

According to some exemplary embodiments, blockchain means a distributed ledger, tangle or similar distributed database with or without consensus algorithms. This includes proof of work, proof of stake, proof of identity, proof of authority and other algorithms.

In various exemplary embodiments, a mechanism is provided that enables participants (such as blockchain participants 120 and 130) in a distributed ledger or blockchain to exchange security information to ensure other participants that entities can and should participate in activities, transactions or data exchanges with the network. This mechanism allows entities (such as entities 105 and 115) to self-validate, self-identify, and self-certify their security. This mechanism allows entities to validate each other with various examinations and challenges to remotely ascertain the security posture of another participant.

This mechanism allows participants/entities/auditors (some of which are not shown in FIG. 1A) to publish and consume these security validations in order to make determinations or vote on the security of entities in the system. The mechanism further provides for a consensus algorithm to determine if entities are "sufficiently secure" to participate in the network, and at what level they can participate. Entities may be able to participate as observers in the Distributed Ledger Technology ("DLT") or blockchain, or they may be able to submit transactions or messages to the DLT or blockchain, or they may be able to validate other transactions ("mining" or "validation") of other transactions. A percentage score may be attributed to nodes based on their self-certification or the certification of other nodes in the consensus network.

According to some exemplary embodiments, the blockchain participants and/or entities may not have a physical presence or a limited physical presence. Instead, they may rely upon various contracts (or smart contracts), deeds, escrow mechanisms, etc.

EXAMPLES

Nodes validate themselves according to one or more criteria. Nodes (such as entities 105 and 115) are computers involved in operation or using the blockchain(s), such as blockchain 110.

For example, criteria can be on the blockchain 110 as a condition for joining a network, such as:

Publishing Self-Verification

For example, each party could self-verify itself and publish a copy on the blockchain 110.

Operating System ("OS") Version

For example, Tripwire looks at one's operating system, and if something changes, it will send an alert because when hackers break into a computer, they change elements in the operating system, so they have a back door or something similar. Tripwire is set on servers typically to monitor them. Tripwire watches constantly until something changes.

Patches

For example, when a questionable party is running an unpatched operating system version that has known security vulnerabilities from two years ago, a trusted party might want to make the questionable party a read-only party. Transactions with the questionable party may be limited or eliminated.

Blockchain/Software Version

For example, if the software that is being used on a party's blockchain is old, another person may not want to work with the party having the older software. It could have security vulnerabilities. In some cases, a security verification service such as security verification service 125 could limit or eliminate the party having the older software from the network.

Hardware Description

For example, a requirement that encryption keys have to be managed in hardware, minimizes the risk of somebody logging in to a computer and stealing them. If someone is not doing that, the rest of the blockchain network should know about it and eliminate the offending party from the network. If the offending party corrects the problem and performs a successful self-audit, they might be readmitted to the blockchain network.

Hardware Scan, Hardware Security Module ("HSM"), etc.

For example, this encryption device may keep a person's keys secured. If a person ever copies them, that person can pretend to be someone else. An HSM is a piece of hardware on the computer or plugged into the computer that manages those keys, and makes it very difficult if not impossible for hackers to copy them and become an impersonator.

Security Software Installed on the Blockchain Computer

For example, a blockchain network could agree as a consortium on the minimum requirements to participate in a blockchain network, especially with trade or finance documents.

Administrative Permission on the Blockchain Computer

For example, a limited number of people should have administrative permission on the blockchain network.

In various exemplary embodiments, this is all about taking what is done inside a single enterprise and spreading it out between multiple enterprises that are collaborating through a blockchain. This is for inter-enterprise communication and blockchain transactions, but actually using the blockchain itself to distribute that information, to verify that information, to record that information, sign it, and then create policies that say that keep the entire environment uniform.

For example, Homeland Security, CIA, NSA collaborating together are not likely going to trust each other's systems. They're going to want to use the blockchain to share intelligence information, but they're going to want to make sure that the other party is secure.

Another example is a bank in Hong Kong and a bank on the West Coast doing a trade finance deal where they're going to put up $20 million to fund a shipment from Hong Kong to the West Coast, and there's insurance brokers engaged to ensure that the deal takes place. Today, that's done with paper and legal contracts, and letters of credit.

Blockchain can speed up such transaction. Computers can match the documents to make sure the bills of leaving match. Same thing with deeds. In a system in a country where paper deeds are replaced with a blockchain deed so that everyone can start to see who owns what, then one wants to make sure everyone who participates in that environment is a trusted party.

FIG. 1 shows blockchain participating nodes (such as entities 105 and 115) issuing and receiving security certifications to and from the shared blockchain, such as blockchain 110. FIG. 1 shows an external security verification service, such as security verification service 125 that accesses the blockchain 110 and is able to access security certifications from other participants on the blockchain (such as blockchain participants 120 and 125). The external security verification service 125 can inform blockchain participants 120 and 130, through the blockchain 110 or through other electronic communication forms, about the assessed security of other participants in the blockchain. Such information can include information based on security certifications, third party security scans, anomalous behavior of a node such as transactions coming from different IP addresses than expected, which could indicate that a participant's private keys have been copied or stolen or accessed inappropriately.

Criteria can be used to validate the participation of a node in transactions/messages. Criteria can also be used to revoke permission for participating in transactions/messages. Nodes can query the security of each other and publish these to the blockchain. Examples of such queries include:

Sign a message with a private key.
Verify an operating system version.
Verify a software version(s).
Confirm a copy of the blockchain.
Use a hash of one's blockchain combined with a hash of one's environment and send to the blockchain with a timestamp and nonce.

External security validation checks may be included in a party's attestation. These can be signed and hashed or not, also timestamped.

In some exemplary environments, nodes may self-certify security information and publish this to the blockchain on a periodic basis. This information can be encrypted with keys accessible to auditors or all or a subset of the blockchain.

Nodes can scan each other (e.g., portscan or a more in-depth security scan) other nodes in a network. The nodes in the network may publish their addresses (IP or otherwise) and grant permission to other nodes in the network to scan them, when other non-validated nodes are not permitted.

Scan results can be published to the blockchain for future auditing, assisting forensics analysis, insurance claims, litigation, etc. when analyzed.

An example of the protection of the security data is to encrypt the security data with keys that can permit one or more authorized entities to read the data. In some exemplary embodiments, it can be one or more symmetric keys or it can be a public key of authorized receivers. In some embodiments, it can be a symmetric key, which is encrypted with the public keys of one or more authorized readers and each key is added to the statement.

Another example is in the case of an employee receiving a phishing email where he or she clicks on something and it throws their system off. A security verification service or another party can detect it and drop the compromised party until the problem is fixed.

According to various exemplary embodiments herein, a party can indicate they performed an antivirus scan, or the version of their verificational software and when it was updated. This information can be posted into the blockchain as a separate type of message. At the same time, the party might be sending payment instructions back and forth or trade finance instructions, or parties such as Homeland Security might be sending criminal information.

In further exemplary embodiments, there may be periodic transactions such as every day or every hour that are posted and digitally signed. Because this activity takes place on the blockchain, all of the different parties can read it and make their own security verification decisions if they wish. Should any of this information become compromised, a roll back to the latest version may take place. For example, a consensus of the parties on the network could have a consensus message, where all agree to roll back to the last time the compromised party was secure or the last time the compromised party published something on the blockchain when that party was secure.

The security verification service, in many exemplary embodiments, could be employed, independent of the actual participants in the blockchain. The security verification service could perform security verification and attestation. For example, the security verification service might have a contract to perform a penetration test on a particular company in the blockchain. For example, the security verification service might have a contract to perform a pen test or another type of test.

In some exemplary cases, independent companies, for example, auditors or security companies could make attestations indicating certain data or certificates are actually true. They can also be the arbiter of whether a particular party on the blockchain is going to be removed from the blockchain. In another example, a new party that desires to join a blockchain may send attestation information to the security verification service.

Each party in the blockchain, according to many exemplary embodiments, has a private key that it signs most everything. The security verification service protects the private keys that are on a blockchain member's computers, servers, etc. If any unauthorized party accesses a private key, they can copy it, and then they can pretend to be the authorized party. For example, the unauthorized party could post fake data such as stating they are sending an invoice for ten-million United States Dollars (USD) and if the recipient(s) believes it, and the payment is issued, the unauthorized party just made ten-million UDS.

In many exemplary situations, blockchain software can be used for numerous purposes. For example, it could be trade and/or finance software. It could be payments software. It could be intellectual property management software. It could be used to publish claims and to establish prior art. In another example, a blockchain could be created where a person could encrypt certain material and download it on the blockchain. One could go back and prove its existence at a particular point in time. Denial is virtually impossible, because of the cryptographic mechanisms of the blockchain.

A security verification service or a member of the blockchain, in several exemplary situations, would have the ability to request another party to perform a scan and to return the results to the requesting party. Scan results may not be published in certain situations, just the fact that a scan was performed. Such scans may also be randomly performed. In several exemplary situations, certain keys will allow publication in plain text, which means everyone who has access can read it.

Another exemplary embodiment performs anti-money-laundering control checks. An attestation service, such as an audit firm could indicate that a party is performing sufficient anti-money-laundering ("AML") and know-your-customer ("KYC") controls on the people who are using that party's services and/or products. This could also be performed on an exchange, and one of the things that an exchange is going to have to do is verify that they know who their customers are and that the exchange is doing some sort of anti-money-laundering control against it. Examples of parties that could benefit from this would include the New York Stock Exchange ("NYSE"), or other similar exchanges and parties like Coinbase.

For example, an organization like Deloitte is the auditor for one of these exchanges. They perform audits periodically, including checking the identity documents for all of the users and/or participants. For example, they check passports, driver's licenses, real IDs, etc. They know the users and/or participants are not fake. They can also weed out the people who launder money.

The auditors will also check on a transaction-by-transaction basis when certain parties accept transactions from the blockchain. For example, if someone sends $50 million to perform a trade, they will want to know such information as where the money came from, and make sure the money is not from illegal drug marketing or illegal money laundering. The security verification service would use this information from the audit firm. It would result in an enhanced version of verification over the blockchain. If a party in the blockchain fails in some fashion, the security verification service would remove them or assist in removing them from the blockchain. The security verification service, in addition to performing security, would perform KYC and AML attestations. This would be applicable to both private and public blockchains (e.g. Bitcoin).

The exemplary embodiments herein would also be applicable to market manipulation detection. For example, it would be applicable to the case of the price of one currency that is traded against another currency when someone starts pumping the price up by artificially inflating the order book. That is, a person could artificially inflate the order book with fake orders and drive the price up of something artificially, which is traded against something like Bitcoin. For example, one takes a position of Tether against Bitcoin. It will pump up the demand for Tether artificially, and then they can get Bitcoin at higher prices, and then they can waive the order. The security verification service can determine if a party is placing orders for some fictitious person that doesn't exist (in order to pump up the order). In some cases, the security verification service could be the means that performs market supervision and operated by a regulator. Or a private third party could perform this service. Either way, such exemplary embodiments could reduce and/or improve the increasing problem of market volatility.

For example, in posting order book information, one knows buy prices, sell prices, and time. This can be posted on a blockchain on a periodic basis, and the service verification service can monitor this. By also posting some user information, it would be able to tie back to an audit at a later time. The user information could be a user I.D., it could be an internal account number and/or a synthetic cache of the username. As long as it is a unique I.D., it can be tied back. If a fake price run-up is detected, and confirmed (e.g. by the Securities and Exchange Commission), the blockchain can be rolled back to a point of consensus.

Figure 1B:
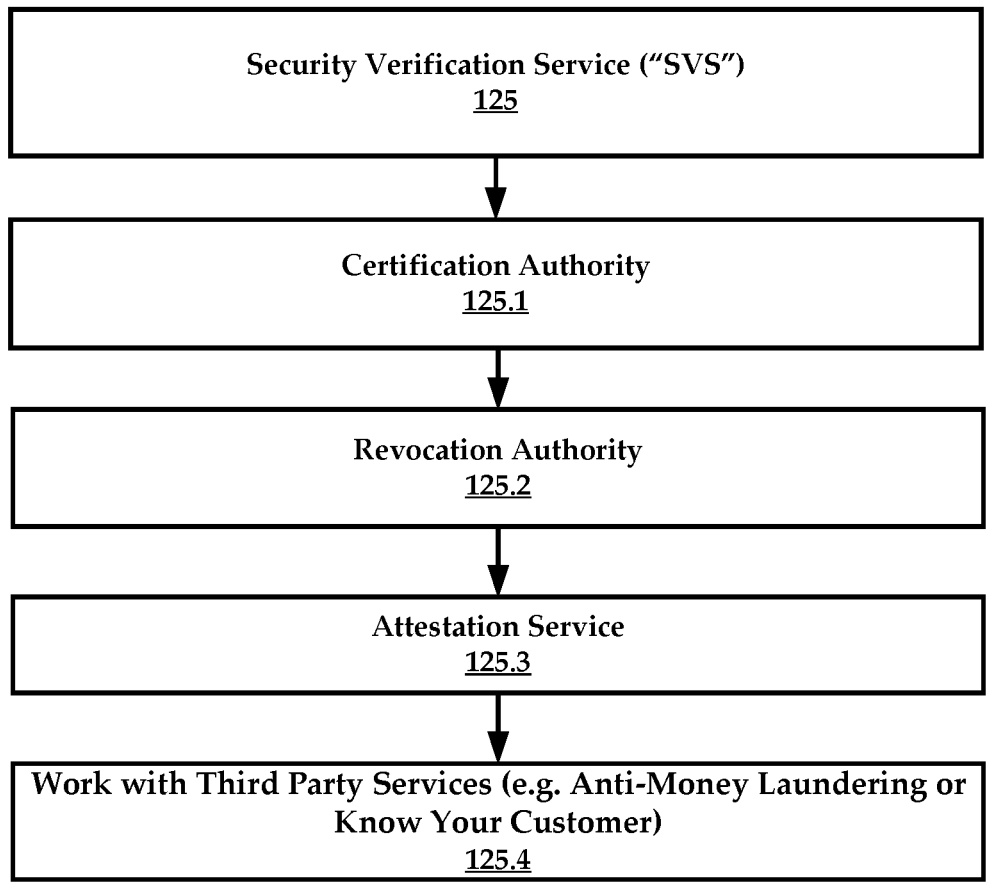
FIG. 1B shows various exemplary functions performed by the Security Verification Service of FIG. 1A.

FIG. 1B shows various exemplary functions performed by the Security Verification Service 125 of FIG. 1A.

As shown in FIG. 1B, the Security Verification Service 125 ("SVS"), may act as a certification authority 125.1. For example, the SVS may act to maintain the integrity of the blockchain community 100 (FIG. 1A). Certificates issued by, verified by or revoked by a Certificate may be used by members of the blockchain community to confirm their access to the blockchain or to issue or verify or digitally sign new blocks or transaction or data posted to the blockchain.

In maintaining the integrity of the blockchain community 100, the SVS may act as a revocation authority 125.2. For example, the SVS may have the power to remove or disqualify the presence of certain parties from the blockchain community 100.

In some exemplary embodiments, the SVS may function as an attestation service 125.3. For example, on its own or in connection with blockchain community participants, the SVS may periodically check on the integrity of one or more blockchain community participants.

In even further exemplary embodiments, the SVS may work with third party services 125.4 (e.g. auditors), to obtain assurances that blockchain members are maintaining proper controls against such illegal activities as money laundering that might even be caused by drug trafficking, or are performing Know Your Customer verification.

Figure 2:
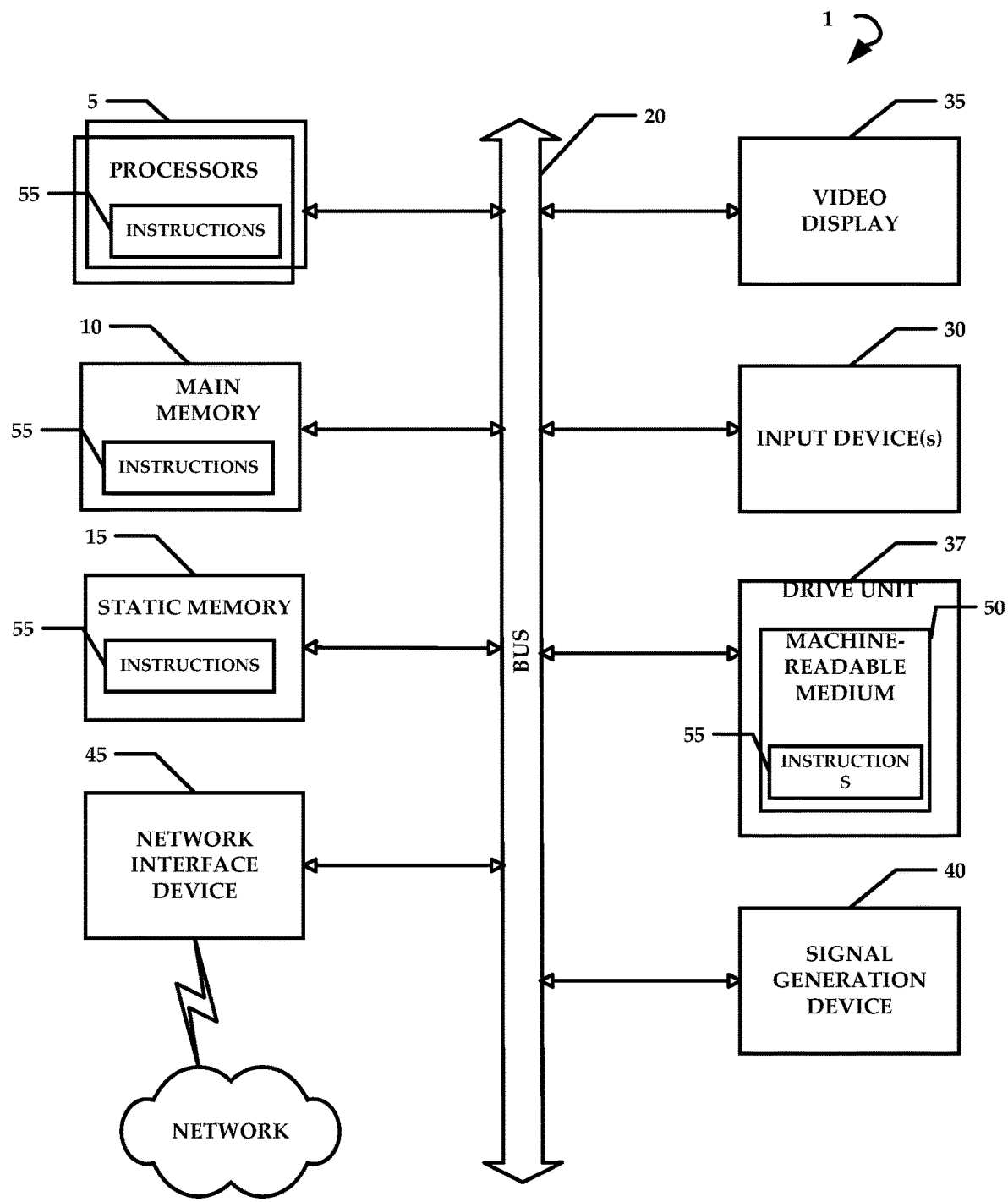
FIG. 2 is a diagrammatic representation of an exemplary system in the form of a computer system 1, within which a set of instructions for causing the machine to perform any one or more of the methodologies discussed herein may be executed.

FIG. 2 is a diagrammatic representation of an exemplary system in the form of a computer system 1, within which a set of instructions for causing the machine to perform any one or more of the methodologies discussed herein may be executed. In various example embodiments, the machine operates as a standalone device or may be connected (e.g., networked) to other machines. It could be executed within a Customer Relations Management ("CRM") system. In some cases, the systems and methods herein may send an API call to Salesforce or the like. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a smart speaker like Echo or Google Home, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network (e.g., network 120) via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations.

Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

Please note: blockchain, distributed ledger, tangle are all interchangeable in these claims and this patent disclosure. Node, individual, company, certifier, arbiter, are all interchangeable. Validation, evaluation, certification, claim are also used interchangeably.

What is claimed is:

1. A method for creating a secure self-validating network of distributed ledger participants, the method comprising:
    providing a security verification service communicatively coupled to a central blockchain, the security verification service comprising time-based analysis of security certifications of a plurality of entities to determine a trustworthiness of each of the plurality of entities communicatively coupled to the central blockchain, the security verification service determining a trustworthiness independent of actual participants in the central blockchain;
    providing a consensus message to the plurality of entities to rollback the central blockchain to a last time a compromised party published a secure transaction to the central blockchain; and
    verifying a security evaluation, validation, or certification of other entities on the secure self-validating network comprising:
        each entity signing a message with a private key;
        each entity verifying an operating system version;
        each entity verifying a software version;
        each entity confirming a copy of the central blockchain; and
    each entity using a hash of the central blockchain for each respective entity combined with a hash of an environment for each respective entity and sending the hash to the central blockchain with a timestamp and a nonce.

2. The method of claim 1, further comprising encrypting the security evaluation, validation, or certification, the encrypting allowing only authorized entities to read encrypted information.

3. The method of claim 2, further comprising an entity cross-certifying another entity in the secure self-validating network.

4. The method of claim 3, further comprising an entity in the secure self-validating network issuing a security challenge to another entity in the secure self-validating network.

5. The method of claim 4, further comprising an entity in the secure self-validating network revoking a public key in the central blockchain on the network.

6. The method of claim 5, further comprising an entity in the secure self-validating network revoking a private key in the central blockchain on the secure self-validating network.

7. The method of claim 6, further comprising one or more of the plurality of the entities in the secure self-validating network predefining a condition for a rollback of the central blockchain.

8. The method of claim 7, further comprising one or more of the plurality of the entities in the secure self-validating network predefining a condition for a rollback of a subset of transactions in the central blockchain.

9. The method of claim 1, wherein the security verification service includes a percentage score of each of the plurality of entities in the secure self-validating network based on a certification from other entities in the secure self-validating network.

10. The method of claim 1, wherein the security verification service comprises detecting operating system changes for the plurality of entities in the secure self-validating network and detecting unpatched operating system versions for the plurality of entities in the secure self-validating network.

11. A system for creating a secure self-validating network of distributed ledger participants, the system comprising:
    a memory storing at least computer-executable instructions; and
    at least one processor operatively coupled to the memory, the at least one processor executing the computer-executable instructions to:
        provide a security verification service communicatively coupled to a central blockchain, the security verification service comprising time-based analysis of security certifications of a plurality of entities to determine a trustworthiness of each of the plurality of entities communicatively coupled to the central blockchain, the security verification service determining a trustworthiness independent of actual participants in the central blockchain;
        provide a consensus message to the plurality of entities to rollback the central blockchain to a last time a compromised party published a secure transaction to the central blockchain; and
        verify a security evaluation, validation, or certification of other entities on the secure self-validating network comprising:
            each entity signing a message with a private key,
            each entity verifying an operating system version,
            each entity verifying a software version,
            each entity confirming a copy of the central blockchain, and
            each entity using a hash of the central blockchain for each respective entity combined with a hash of an environment for each respective entity and sending the hash to the central blockchain with a timestamp and a nonce.

12. The system of claim 11, wherein the security verification service comprises detecting operating system changes for the plurality of entities in the secure self-validating network and detecting unpatched operating system versions for the plurality of entities in the secure self-validating network.

13. The system of claim 11, causing the at least one processor to execute the computer-executable instructions to further cause: one or more of the plurality of the entities in the secure self-validating network to define a condition for the rollback of the central blockchain.

14. The system of claim 11, causing the at least one processor to execute the computer-executable instructions to further: encrypt the security evaluation, validation, or certification, the encrypting allowing only authorized entities to read encrypted information, the encrypted information being encrypted and decrypted using encryption keys managed in hardware, the hardware being a Hardware Security Module (HSM).

15. The system of claim 11, wherein the security verification service is a revocation authority, the revocation authority removing an entity of the plurality of entities.

16. The system of claim 11, wherein the security verification service is an attestation service, the attestation service periodically checking integrity of an entity of the plurality of entities.

17. The system of claim 11, wherein the security verification service works with third party services to maintain proper controls, third party services providing Know Your Customer verification.

18. The system of claim 11, causing the at least one processor to execute the computer-executable instructions to further: encrypt the security evaluation, validation, or certification, the encrypting allowing only authorized entities to read encrypted information, wherein the encrypted information is encrypted and decrypted using encryption keys, the encryption keys including symmetric keys and a public key of authorized receivers.

19. The system of claim 11, causing the at least one processor to execute the computer-executable instructions to further: encrypt the security evaluation, validation, or certification, the encrypting allowing only authorized entities to read encrypted information, wherein the encrypted information is encrypted and decrypted using encryption keys, the encryption keys including a public key of authorized receivers allowing for publication in plain text of a security scan result.

20. One or more non-transitory computer-readable storage media storing computer-readable instructions for creating a secure self-validating network of distributed ledger participants, that when executed by at least one processor cause the at least one processor to perform operations comprising:
  providing a security verification service communicatively coupled to a central blockchain, the security verification service comprising time-based analysis of security certifications of a plurality of entities to determine a trustworthiness of each of the plurality of entities communicatively coupled to the central blockchain, the security verification service determining a trustworthiness independent of actual participants in the central blockchain;
  providing a consensus message to the plurality of entities to rollback the central blockchain to a last time a compromised party published a secure transaction to the central blockchain; and
  verifying a security evaluation, validation, or certification of other entities on the secure self-validating network comprising;
    each entity signing a message with a private key,
    each entity verifying an operating system version,
    each entity verifying a software version,
    each entity confirming a copy of the central blockchain, and
    each entity using a hash of the central blockchain for each respective entity combined with a hash of an environment for each respective entity and sending the hash to the central blockchain with a timestamp and a nonce.

* * * * *